United States Patent
Das Gupta et al.

(10) Patent No.: US 8,160,380 B2
(45) Date of Patent: Apr. 17, 2012

(54) BI-AFFINITY FILTER: A BILATERAL TYPE FILTER FOR COLOR IMAGES

(75) Inventors: Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 118 days.

(21) Appl. No.: 12/832,757

(22) Filed: Jul. 8, 2010

(65) Prior Publication Data
US 2012/0008862 A1     Jan. 12, 2012

(51) Int. Cl.
*G06K 9/40* (2006.01)
*H04N 3/14* (2006.01)

(52) U.S. Cl. .......................... 382/260; 348/272

(58) Field of Classification Search .......... 382/162, 382/163, 164, 165, 166, 167, 260, 261, 262, 382/263, 264; 348/263, 270, 271, 272, 273; 523/160, 161, 400
See application file for complete search history.

(56) References Cited

U.S. PATENT DOCUMENTS

| | | | | |
|---|---|---|---|---|
| 7,470,730 | B2 * | 12/2008 | Nishida et al. | 523/160 |
| 7,657,118 | B2 * | 2/2010 | Aufranc et al. | 382/276 |
| 2002/0186309 | A1 | 12/2002 | Keshet et al. | |
| 2004/0048950 | A1 | 3/2004 | Nishida et al. | |
| 2005/0276475 | A1 | 12/2005 | Sawada | |

OTHER PUBLICATIONS

Bando, Y., et al., "Extracting Depth and Matte using a Color-Filtered Aperture", vol. 27, Issue 5, Proceedings of ACM SIGGRAPH Asia 2008.

Bennett, Eric P., et al., "Video and Image Bayesian Demosaicing with a Two Color Image Prior", ECCV 2006, Part I, LNCS 3951, pp. 508-521, 2006.

Geusebrock, Jan-Mark, et al., "Fast Anisotropic Gauss Filtering", IEEE Transactions on Image Processing, vol. 12, No. 8, Aug. 2003.

Irani, M., et al., "Motion Analysis for Image Enhancement: Resolution, Occlusion, and Transparency", Journal of Visual Communication and Image Representation, vol. 4, Issue 4, Dec. 1993.

Joshi, N., et al., "Image Deblurring and Denoising using Color Priors", 2009 IEEE Conference on Computer Vision and Pattern Recognition, Jun. 20-25, 2009.

Levin, A., et al., "A Closed Form Solution to Natural Image Matting", IEEE Transactions on Pattern Analysis and Machine Intelligence, vol. 30, No. 2, Feb. 2008.

Liu, C., et al., "Automatic Estimation and Removal of Noise from a Single Image", Microsoft Research, Dec. 2006.

Lu, Wu-Sheng, et al., "Design of Two-Dimensional Digital Filters Using Singular-Value Decomposition and Balanced Approximation Method", IEEE Transactions on Signal Processing, vol. 39, No. 10, Oct. 1991.

(Continued)

*Primary Examiner* — Abolfazl Tabatabai
(74) *Attorney, Agent, or Firm* — Rosalio Haro

(57) ABSTRACT

Application of an image filtering algorithm, which defines an algorithm window within which a center pixel is processed relative to the other pixels within the algorithm window, is improved by use of an extended window larger than and encompassing the algorithm window. This approached is applied with an edge preserving filter that works on the principle of matting affinity and allows a better representation of the range filter term in bilateral class filters. An approximate bi-affinity filter whose output is shown to be very similar to the traditional bilateral filter is defined. The present technique has the added advantage that no color space changes are required and hence an input image can be handled in its original color space.

17 Claims, 13 Drawing Sheets

OTHER PUBLICATIONS

Omer, I., et al., "Color Lines: Image Specific Color Representation", 2004 IEEE Computer Society Conference on Computer Vision and Pattern Recognition vol. 2, (CVPR '04).

Paris, S., et al., "A Fast Approximation of the Bilateral Filter using a Signal Processing Approach", International Journal of Computer Vision, vol. 81, No. 1, Jan. 2009.

Porikli, F., "Constant Time O(1) Bilateral Filtering", CVPR, 2008.

Tomasi, C., et al., "Bilateral Filtering for Gray and Color Images", Proceedings of the 1998 IEEE International Conference on Computer Vision, Bombay India, 1998.

Weiss, B., "Fast Median and Bilateral Filtering", ACM Transactions on Graphics (TOG), vol. 25, issue 3, Jul. 2006.

Wells, W., III, "Efficient Synthesis of Gaussian Filters by Cascaded Uniform Filters", IEEE Transactions on Pattern Analysis and Machine Intelligence, vol. PAMI-8, No. 2, Mar. 1986.

Yang, Q., et al., "Real-Time O (1) Bilateral Filtering", IEEE Conference on Computer Vision and Pattern Recognition, CVPR 2009.

* cited by examiner

| RGB (0,0) | RGB (0,1) | RGB (0,2) | ... | RGB (0,N) |
|---|---|---|---|---|
| RGB (1,0) | RGB (1,1) | RGB (1,2) | ... | RGB (1,N) |
| RGB (2,0) | RGB (2,1) | RGB (2,2) | ... | RGB (2,N) |
| ⋮ | ⋮ | ⋮ | ⋱ | |
| RGB (M,0) | RGB (M,1) | RGB (M,2) | | RGB (M,N) |

FIG. 3A

| $R^2G^2B^2$ (0,0) | $R^2G^2B^2$ (0,1) | $R^2G^2B^2$ (0,2) | ... | $R^2G^2B^2$ (0,N) |
|---|---|---|---|---|
| $R^2G^2B^2$ (1,0) | $R^2G^2B^2$ (1,1) | $R^2G^2B^2$ (1,2) | ... | $R^2G^2B^2$ (1,N) |
| $R^2G^2B^2$ (2,0) | $R^2G^2B^2$ (2,1) | $R^2G^2B^2$ (2,2) | ... | $R^2G^2B^2$ (2,N) |
| ⋮ | ⋮ | ⋮ | ⋱ | |
| $R^2G^2B^2$ (M,0) | $R^2G^2B^2$ (M,1) | $R^2G^2B^2$ (M,2) | | $R^2G^2B^2$ (M,N) |

FIG. 3B

| RG, RB, GB (0,0) | RG, RB, GB (0,1) | RG, RB, GB (0,2) | ... | RG, RB, GB (0,N) |
|---|---|---|---|---|
| RG, RB, GB (1,0) | RG, RB, GB (1,1) | RG, RB, GB (1,2) | ... | RG, RB, GB (1,N) |
| RG, RB, GB (2,0) | RG, RB, GB (2,1) | RG, RB, GB (2,2) | ... | RG, RB, GB (2,N) |
| ⋮ | ⋮ | ⋮ | ⋱ | |
| RG, RB, GB (M,0) | RG, RB, GB (M,1) | RG, RB, GB (M,2) | | RG, RB, GB (M,N) |

FIG. 3C

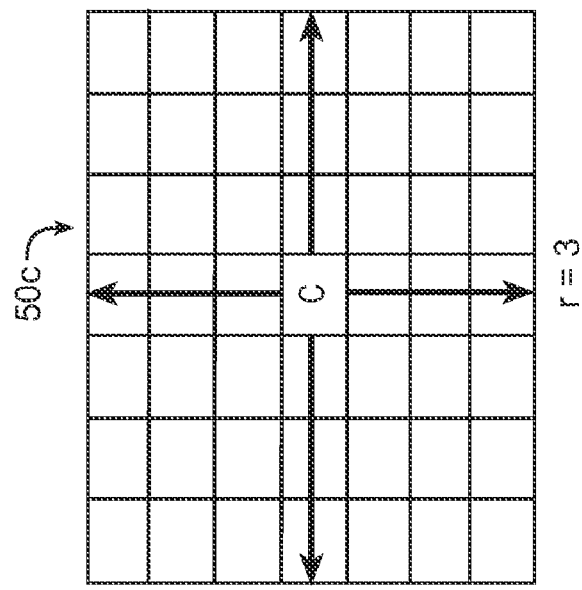
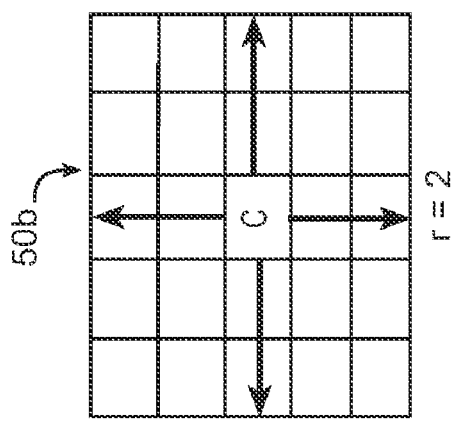
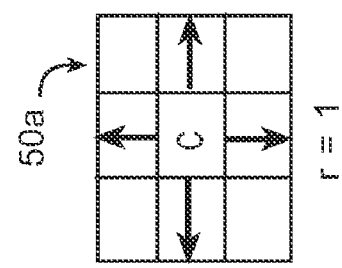
FIG. 5

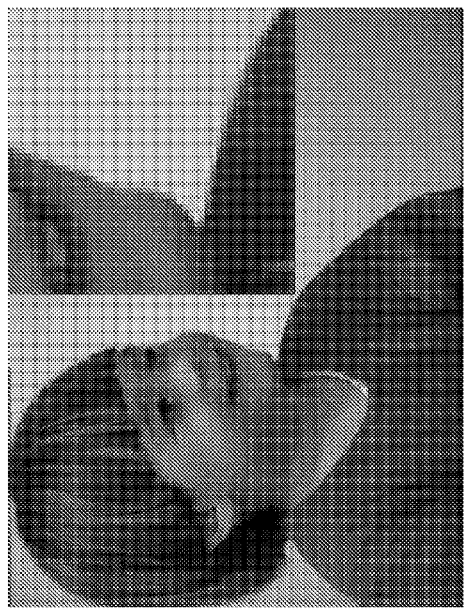
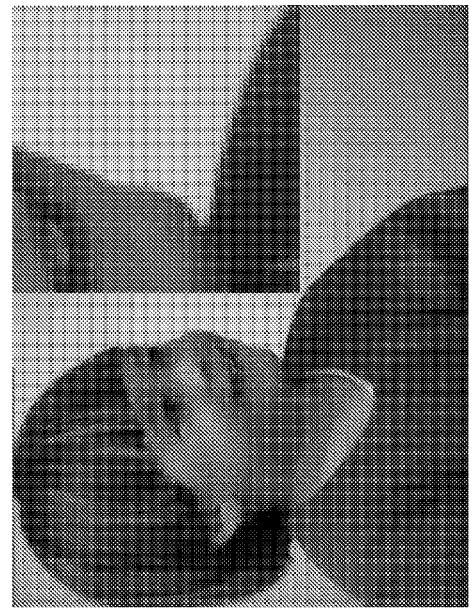
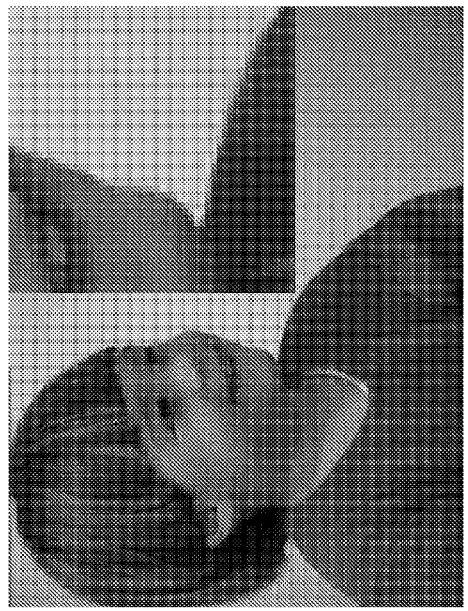
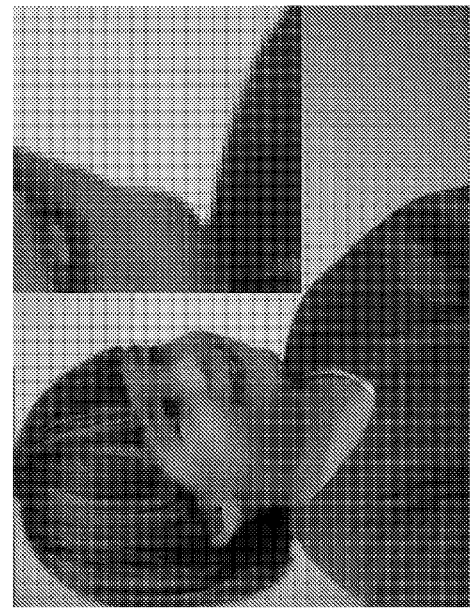
FIG. 13

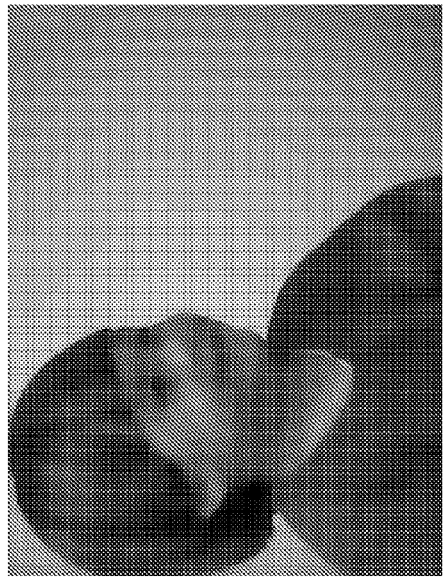
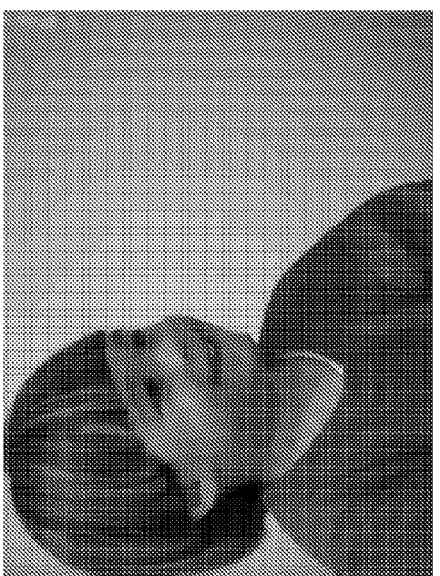
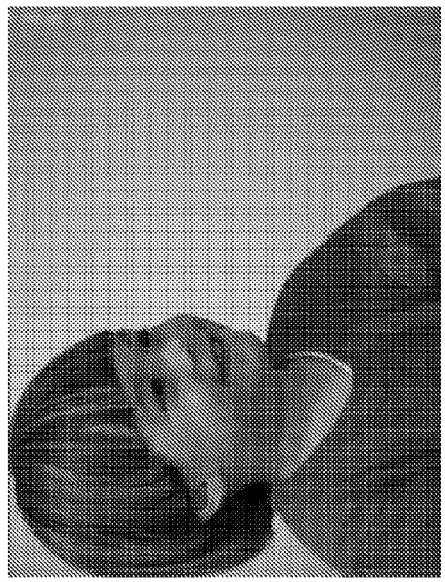
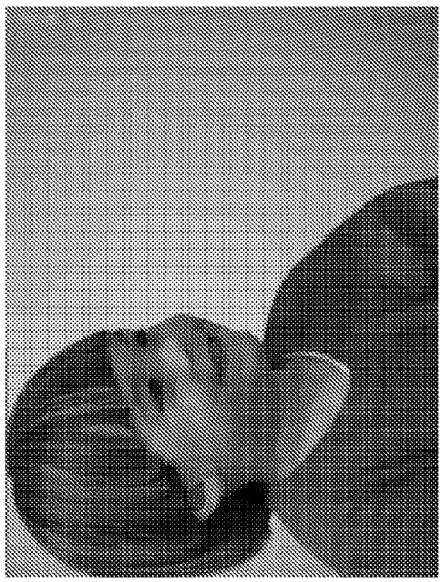
FIG. 14

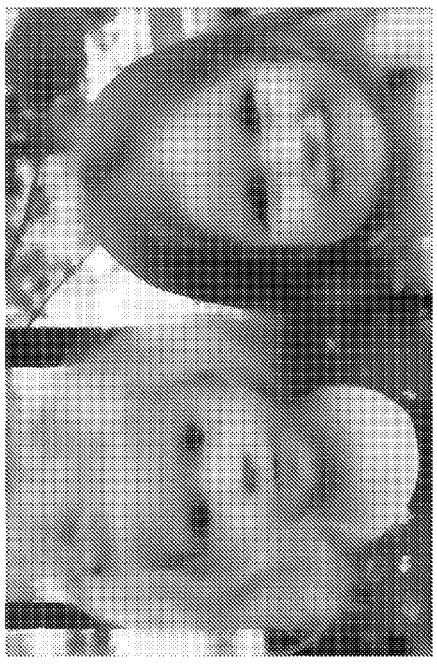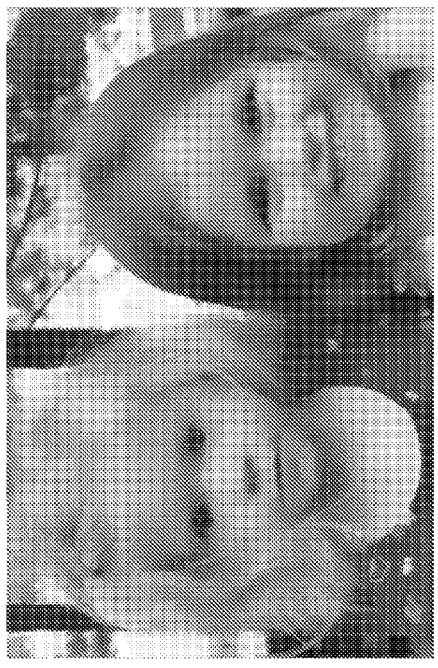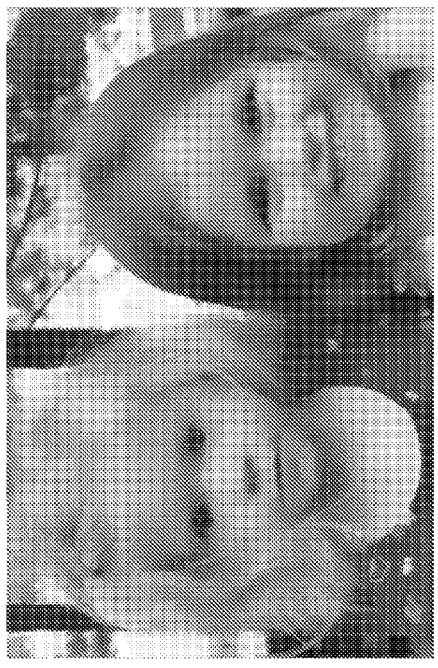
FIG. 15

BI-AFFINITY FILTER: A BILATERAL TYPE FILTER FOR COLOR IMAGES

CROSS-REFERENCE TO RELATED APPLICATIONS

U.S. patent application Ser. No. 12/752,615, is hereby incorporated by reference in its entirety.

BACKGROUND

1. Field of Invention

The present invention pertains to the field of image processing.

2. Description of Related Art

The bilateral filter was originally proposed by Tomasi and Manduchi in Bilateral *Filtering for Gray and Color Images*, ICCV: Proceedings of the Sixth International Conference on Computer Vision, page 839, 1998, IEEE Computer Society, herein incorporated in its entirety by reference. Basically, the bilateral filter smoothes an image while preserving edges by means of a nonlinear combination of nearby image values. The principle idea behind such a filtering operation is to combine information from the spatial domain as well as from a feature domain (typically the color domain). It can be represented as $$h(x) = \frac{1}{k(h)} \sum_{y \in \Omega_x} f_s(x, y) g_r(I(x), I(y)) I(y) \quad (1)$$

where I and h are the input and output images respectively, x and y are pixel locations over an image grid, $\Omega_x$ is the neighborhood induced around the central pixel x, $f_s(x, y)$ measures the spatial affinity between pixels at x and y (i.e. the spatial domain, and may be thought of as a spatial filter) and $g_r(I(x), I(y))$ denotes the feature/measurement/photometric affinity (i.e. the feature domain, and may be thought of as a range filter). Parameter k(x) is a normalization term given by $$k(x) = \sum_{y \in \Omega_x} f_s(x, y) g_r(I(x), I(y)) \quad (2)$$

The spatial and range filters (f and g, respectively), are commonly set to be Gaussian filters, as follows:

$$f_s(x, y) = \exp\left(\frac{-\|x - y\|_2^2}{2\sigma_s^2}\right) \quad (3)$$

$$g_r(u, v) = \exp\left(\frac{-\|u - v\|_2^2}{2\sigma_r^2}\right) \quad (4)$$

parameterized by variances $\sigma_s$ and $\sigma_r$. The range filter, $g_r$, penalizes distance in the feature space and hence the filter has an inherent edge preserving property. Due to this property, the bilateral filter, as an edge-preserving filter, has been one of the most widely used filtering techniques within computer vision community.

Since its inception, most research has focused on improving the time/space complexity of the bilateral filter, since the product between the two responses in Eqn. 1 makes the response non-linear. Its nonlinearity makes it a computationally intensive operation and, as such, many researchers have proposed techniques to decompose the non-linear, bilateral filter into a sum of separate, one-dimensional filters or similar cascaded representations. Singular value decomposition of the 2D kernel is one such technique. Another proposed technique is an approximation of the bilateral filter by filtering sub-sampled copies of an image with discrete intensity kernels, and recombining the results using linear interpolation.

Recently the run-time of the bilateral filter has been identified as a critical bottleneck, and a few techniques have been proposed that render the filtering operation at an almost constant time, albeit with larger space requirements and behavioral approximations.

While much research has focused on speeding up the processing of the bilateral filter, it's handling of color images, which is a key weakness of the bilateral filter, has largely been overlooked by the vision community.

It is an object of the present invention to provide a new technique for improved handling of color images.

It is another object of the present invention to provide a method of improving the efficiency of processing digital images.

It is another object of the present invention to provide a filter that provides similar image smoothing and edge preserving properties as a bilateral filter, but which is less constrained by nonlinear combination of image values.

It is a further object of the present invention to provide a filter that provides similar image smoothing and edge preserving properties as a bilateral filter, but which lends itself to increased implementation optimizations.

SUMMARY OF INVENTION

The above objects are met in a method of processing a digital, input image including: providing the digital input image, I, in physical memory, the input image having color information in a native color space for each image pixel; providing a processing device coupled to the physical memory to access the input image I and create an output image, h, by implementing the following steps: applying an image filtering sequence to the input image I, wherein the image filtering sequence applies a filtering algorithm to each pixel of the input image I relative to its surrounding pixels within a window w having a fixed, predefined radius of r pixels extending from a center pixel, pixels of the input image I being processed, in turn, as the center pixel relative to their corresponding window w.

Preferably, the applying of the image filtering sequence includes: (a) for a first of the window w of a first pixel in the input image I to be processed according to the filtering algorithm, defining an extended window bigger than the first window w with the first window at its center; (b) determining statistics needed for the filtering algorithm for all pixels within the extended window; (c) applying the filtering algorithm to all center pixels whose corresponding window w fit fully within the extended window; (d) shifting the extended window within the input image by one unit-shift at a time, wherein at each unit-shift: (i) new statistics are determined for only the new pixels encompassed by the shifted extended window, the new pixels defining a new row or column within the shifted extended window; and (ii) applying the filtering algorithm to all center pixels whose corresponding window w extends to the new row or column.

It is to be understood that the window w and the extended window are smaller than the input image. Further preferably, the extended window is not greater than one-fourth of the size of the input image.

In this approach, the pixel radius of the extended window is defined as the radius r of window w increased by Wx additional pixels, and the number of the center pixels in step (c) is limited to not more than $(2Wx+1)^2$.

In the present method, statistics are determined by calculating the statistics from the image values of each pixel, and in step (d) all but one row or one column of the statistics calculated for the extended window at its immediately previous position are retained when shifting from the immediately previous position to a new position by one unit-shift.

Preferably, the image values of the pixels within the input image are rearranged into integral image form.

In one embodiment, the statistics are calculated and arranged into integral image form prior to the applying of the image filtering sequence, and statistics are determined in steps (b) and (i) by accessing the integral images for the needed statistics.

In a preferred embodiment, the filtering algorithm includes a Bi-Affinity filter defined as $$h_{\sigma,\varepsilon}(x) = \frac{\sum_{y \in \Omega_x} (f_s^\sigma(x,y) L_{xy}^\varepsilon I(y))}{\sum_{y \in \Omega_x} (f_s^\sigma(x,y) L_{xy}^\varepsilon)}$$

where x and y are pixel locations over an image grid, and $\Omega_x$ is the neighborhood induced around the central pixel x; $f_s(x, y)$ measures the spatial affinity between pixels at x and y; parameter σ controls an amount of spatial blurring; $L_{xy}^\varepsilon$ is a laplacian matrix that provides positive color affinity value for two examined pixels, x and y, that have the same color and provides a zero color affinity value for pixels with different color; parameter ε is a regularization term whose relative weight determines the smoothness of output image h, and the laplacian matrix $L_{xy}^\varepsilon$ follows a 2 color model specifying that pixel color $I_i$ in input image I can be represented as a linear combination of two colors P and S as follows:

$$I_i = \alpha_i P + (1-\alpha_i) S, \forall i \in w, 0 \leq \alpha_i \leq 1$$

where the two colors are piecewise smooth and can be derived from local properties within neighborhood $\Omega_x$ containing the pixel i, and wherein piecewise smooth means smooth within a region of similar in size as window w.

Preferably, the Bi-Affinity filter is applied to the input image I in its native color space. The native color space may be the RGB color space.

In the above-defined Bi-Affinity filter, parameter ε determines the smoothness of the decomposition into the two color modes as represented by the smoothness of α estimates. In this case, $\alpha_i$ is defined as:

$$\alpha_i = \sum_c a^c I_i^c + b, \forall i \in w$$

where a are weights for each color channel and is constant for the window w, b is a model parameter, and c is an index over the color channels. Additionally, the α values are determined according to quadratic cost function $J(\alpha)=\alpha^T L \alpha$, where laplacian matrix L is an n×n matrix and n is the total number of pixels in input image I whose (ij)$^{th}$ element is given by $$\sum_{k|(i,j) \in w_k} \left( \delta_{ij} - \frac{1}{|w_k|}\left(1 + (I_i - \mu_k)\left(\sigma_k + \frac{\varepsilon}{|w_k|}I_3\right)^{-1}(I_j - \mu_k)\right) \right)$$

where $\delta_{ij}$ is the Kronecker delta, $\mu_k$ is a 3×1 mean vector of colors inside the $k^{th}$ window with both i and j as members, $\sigma_k$ is the 3×3 covariance matrix, $|w_k|$ is the cardinality of the window and $I_3$ is the identity matrix of size 3×3.

Preferably, the laplacian matrix L is further decomposed into a diagonal matrix D and a weight matrix W with the formulation L=D−W, wherein diagonal matrix D is defined with terms $D_{ii}$=#[k|i∈$w_k$] at its diagonal and represents the cardinality of the number of windows of which the pixel i is a member; individual terms of weight matrix W are given by $$W_{ij} = \sum_{k|(i,j) \in w_k} \frac{1}{|w_k|}\left(1 + (I_i - \mu_k)\left(\sigma_k + \frac{\varepsilon}{|w_k|}I_3\right)^{-1}(I_j - \mu_k)\right)$$

where $\delta_{ij}$ is the Kronecker delta, $\mu_k$ is a 3×1 mean vector of colors inside the $k^{th}$ window with both i and j as members, $\sigma_k$ is the 3×3 covariance matrix, $|w_k|$ is the cardinality of the window and $I_3$ is the identity matrix of size 3×3; and color affinity $W_{ij}$ for two pixels with the same color is a positive quantity varying with the homogeneity of the local windows containing the pixels i and j, and color affinity for pixels with different color is zero.

In this case, the local minima, the solution a satisfies a first order optimality condition $L^T\alpha^*=0$, and the optimal condition is defined as $L^T\alpha^*=(D-W)^T\alpha^*$.

In the above approach, terms of $W_{i,j}$ may optionally be evaluated by counting the contribution of only the center pixel's local window defined as the window centered about it.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 3A illustrates sample image with RGB values for each pixel.

FIG. 3B provides $R^2G^2B^2$ values (i.e. statistics) for each pixel in the sample image of FIG. 3A.

FIG. 3C shows pre-calculated RG-RB-GB values (i.e. statistics) for each pixel in the sample image of FIG. 3A.

FIG. 5 shows three sample pixel windows, each having a different radius value.

FIG. 9A illustrates the creation of a first and second expanded window around an initial window of radius r=1.

FIG. 9B illustrates the creation of a first and second expanded window around an initial window of radius r=2.

FIG. 13 illustrates the effect of regularizations term $\epsilon$ on a window of fixed size, as applied to an input image with regularization term $\epsilon$ values of 0.0005, 0.005, 0.05, and 0.5 to regularization term $\epsilon$.

FIG. 14 is a first comparison of the results of applying the present Bi-affinity filter to an input image, as compared with the results of applying a bilateral filter to the same input image in its native RGB color domain and conversion to the CIELAB color space.

FIG. 15 is a second comparison of the results of applying the present Bi-affinity filter to an input image, as compared with the results of applying a bilateral filter to the same input image in its native RGB color domain and conversion to the CIELAB color space.

DESCRIPTION OF THE PREFERRED EMBODIMENTS

Figure 1:
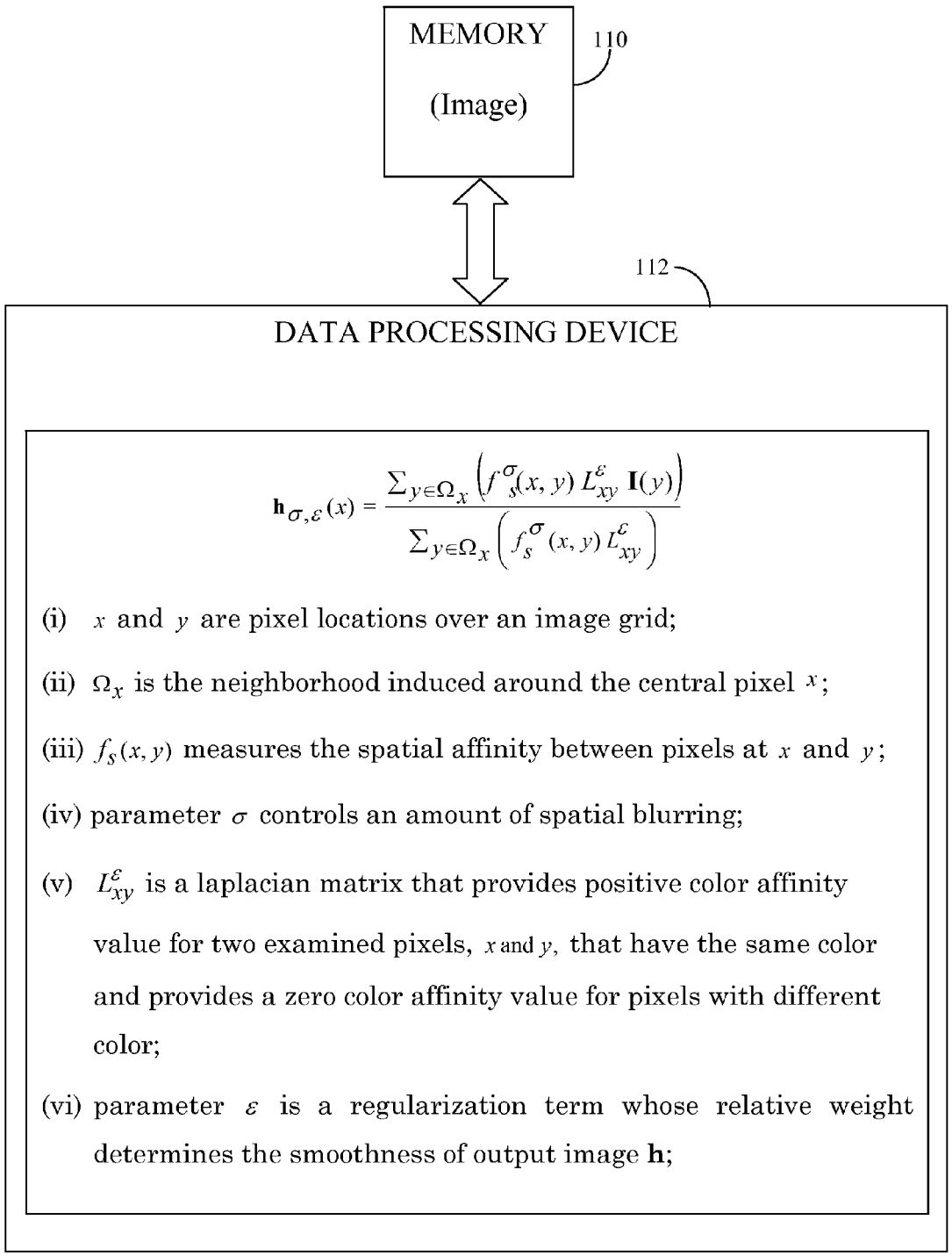
FIG. 1 illustrates a sample setup for applying a filter algorithm to an input image.

Research in the field of the bilateral filter has traditionally overlooked one of its most important shortfalls: a unified handling of multi-channel color images. This is because an image can represent any subject having a multitude of combinations of colors, and the color channels have therefore been traditionally assumed to be independent of each other. Consequently, the bilateral filter processes each color channel independently. For example, an RGB color space, which has three color channels (red, green, and blue), requires separate application of the bilateral filter to each of three color channels: red, green, and blue. As a direct consequence of this, the bilateral filter produces color artifacts at sharp color edges in the RGB color space. This poses a problem since the RGB color space is typically the native color space of color digital images, i.e. images obtained through various digital imaging techniques, such as digital photography or image scanning operations.

One remedy previously proposed is to convert from the native RGB color space to the CIELAB color space, which attempts to approximate human vision (or perception). Like the RGB color space, the CIELAB color space also has three color channels, and thus still requires that the bilateral filter be applied independently to each of three color channels, but the CIELAB is noted for avoiding color artifacts. That is, according to this approach, once the native RGB color image is converted to the CIELAB color space, then channel wise bilateral filter processing does not produce the artifacts apparent from processing in the RGB color space.

The present discussion proposes a new technique suitable for application in an image's native RGB color space, but which works at par with the transformed domain techniques (i.e. the conversion from the native RGB color space to an alternate color space). The avoidance of a color conversion step naturally improves the efficiency of the present approach as compared to the transformed domain techniques.

A new filter, hereafter called the "Bi-affinity filter", for color images is presently proposed. This filter is similar in structure to the bilateral filter, but the proposed Bi-affinity filter is based on a color line model. As will be shown, this approach permits the elimination of the explicit conversion from the RGB color space to a perception-based color space, such as the CIELAB color space.

The present Bi-affinity filter measures the color affinity of a pixel to a small neighborhood around it and weighs the filter term accordingly. It is put forth that this method can perform at par with standard bilateral filters for color images. An added benefit of the present Bi-affinity filter is that not only does it preserve big edges of an input image (a desired characteristic of the bilateral filter), but also preserves and enhances small edges of the input image, a bonus feature which leads to additional applications as an image enhancement filter.

As is explained above, the principle objective of the bilateral filter is to combine information from the spatial domain with a feature domain, and this feature domain is generally the color domain. Determining color affinity between pixels in color images in the RGB domain is complicated by differences in light intensity causing pixels that are close in color to appear quite different and thus have markedly different RGB values. In the prior art, it is therefore generally preferred to convert from the RGB color space to an alternate color space that is better able to separate light intensity values from color values, and then to apply the bilateral filter to the color values in the alternate color space.

Many alternative color spaces have been suggested to separate color from light intensity and create methods for determining whether two pixels share the same color, irrespective of differences in their light intensity. These color spaces can be divided into two groups, namely linear and non-linear. Among the linear color spaces, the most widely used are the YCrCb, YUV, and YIQ color spaces. Among the non-linear color spaces, two sub-groups are popular: a first sub-group that separates color into hue (i.e. color), saturation (i.e. purity), and value (i.e. light intensity), and a second sub-group that separates color into luminance plus two color coordinates. The first sub-group may include the HSV, HSI, HSB, HSL, etc. color spaces. The second sub-group may include the CIELAB and CIE-LUV color spaces that separate color into luminance (i.e. light intensity) and two color coordinates in an effort to create a color space that is perceptually uniform (i.e. close to how the human eye perceives color variations).

Generally, to determine whether two pixels have the same real world color, the color coordinates of a generic color model are used. These color models assume either that there is no color distortion or that there is an identical color distortion for all imaging conditions. In practice, when dealing with real world images of an unknown source, these assumptions are rarely true as scene surface color is distorted differently in different images as well as different image regions, depending on the scene and camera settings.

This leads to the topic of the color line model. The introduction of color lines has been attributed to Omer et al. in *Color lines: Image Specific Color Representation*, CVPR, 2004, herein incorporated in its entirety by reference. Omer et al. proposed the idea that natural images form clusters of pixel colors in the RGB color space. These clusters of pixels appear to form mostly tubular regions, due to the fact that most small regions in natural images can be decomposed into a linear combination of 2 colors. This two-color model has been used for image matting (i.e. separation of a foreground subject from its surrounding background), Bayer de-mosaicing (i.e. reconstruction of a color image from incomplete color samples output from an image sensor overlaid with a Bayer color filter array), and more recently for image de-noising and de-blurring.

The two-color model states that any pixel color $I_i$ in an image I can be represented as a linear combination of two colors P and S, where these colors are piecewise smooth and can be derived from local properties within a small neighborhood containing the pixel i.

$$I_i = \alpha_i P + (1-\alpha_i)S, \forall i \in w, 0 \leq \alpha_i \leq 1 \qquad (5)$$

where w is a small patch, or window, and α is the matting coefficient. The patch size is a key parameter in this two-color model, as it is true for only small neighborhoods, relative to the resolution and size of the image. These "small" neighborhoods are typically defined as 3×3 pixel neighborhoods. However, as the resolution and the size of the images grow, so should the window size as well, to capture a valid neighborhood.

A similar line of reasoning may be used for color images, since Levin et al. show in *A Closed Form Solution to Natural Image Matting*, CVPR, 2006 (herein incorporated in its entirety by reference), that if the color line property is obeyed, then the 4D linear model satisfied by the matting coefficient, within a small window, at each pixel can be written as $$\alpha_i = \sum_c a^c I_i^c + b, \forall i \in w, c \in \{1, 2, 3\} \qquad (6)$$

Where a are weights for each color channel, which is constant for the window w, b is a model parameter, and c is an index that is unique for each window over the color channels.

A cost function for evaluating the matting coefficient α can be formulated from this model. For an image with N pixels, the cost is defined as $$J(\alpha, a, b) = \sum_{k \in N} \left( \sum_{i \in w_k} \left( \alpha_i - \sum_c a_k^c I_i^c - b_k \right)^2 + \varepsilon \sum_c a_k^{c2} \right) \qquad (7)$$

where $w_k$ is a small window around pixel k and $a=\{a_i^c\}$, for all i=[1, N]. ε is a regularization weight for uniqueness as well as smoothness of the solution.

A first theorem is herein proposed, as follow:
Theorem 1: Let $J(\alpha) \doteq \min_{a,b} J(\alpha, a, b)$,
then $J(\alpha) = \alpha^T L \alpha$, where L is a laplacian matrix.

As it is known in the art, and in particular in the mathematical field of graph theory, a laplacian matrix (also called an admittance matrix or Kirchhoff matrix) is a matrix representation of a graph. Together with Kirchhoff's theorem, it can be used to calculate the number of spanning trees for a given graph. In the present case, L is an n×n matrix, whose $ij^{th}$ element is given by $$\sum_{k|(i,j) \in w_k} \left( \delta_{ij} - \frac{1}{|w_k|} \left( 1 + (I_i - \mu_k) \left( \sigma_k + \frac{\varepsilon}{|w_k|} I_3 \right)^{-1} (I_j - \mu_k) \right) \right) \qquad (8)$$

where $\delta_{ij}$ is the Kronecker delta, $\rho_k$ is a 3×1 mean vector of colors inside the $k^{th}$ window with both i and j as members, $I_i$ and $I_j$ are the color vectors at locations i and j, $\sigma_k$ is the 3×3 covariance matrix, $|w_k|$ is the cardinality of the window and $I_3$ is the identity matrix of size 3×3. Note that the term ε is a regularization term and determines the smoothness of the decomposition into two dominant color modes (i.e. two colors P and S). The laplacian matrix defined by L has been termed the matting laplacian.

The decomposition of the laplacian matrix L into a diagonal matrix, D, and an affinity (i.e. weight) matrix, W, leads to the formulation L=D−W. Here D is a diagonal matrix with the terms $D_{ii} = \#[k|i \in w_k]$ at its diagonal, which represents the cardinality of the number of windows of which the pixel i is a member. The individual terms of the affinity matrix W are given by $$W_{ij} = \sum_{k|(i,j) \in w_k} \frac{1}{|w_k|} \left( 1 + (I_i - \mu_k) \left( \sigma_k + \frac{\varepsilon}{|w_k|} I_3 \right)^{-1} (I_j - \mu_k) \right) \qquad (9)$$

This brings the present discussion to the subject of the Bi-affinity filter. It is first noted that by the definition of the laplacian matrix, all its rows sum to zero, which leads to $D_{ii} = \Sigma_j W_{ij}$. At the local minima, the solution α* satisfies the first order optimality condition $L^T \alpha^* = 0$. So the optimal condition can be written as $$L^T \alpha^* = (D - W)^T \alpha^* \qquad (10)$$

$$L^T \alpha^* = \begin{pmatrix} D_{11} \alpha_1^* - \sum_j W_{1j} \alpha_j^* \\ D_{22} \alpha_2^* - \sum_j W_{2j} \alpha_j^* \\ \vdots \\ D_{nn} \alpha_n^* - \sum_j W_{Nj} \alpha_j^* \end{pmatrix} \qquad (11)$$

Substituting $D_{ii} = \Sigma_j W_{ij}$ into the above system of equations and invoking the first order optimality condition leads to $$\begin{pmatrix} \sum_j (\alpha_1^* - \alpha_j^*) W_{1j} \\ \sum_j (\alpha_2^* - \alpha_j^*) W_{2j} \\ \vdots \\ \sum_j (\alpha_n^* - \alpha_j^*) W_{nj} \end{pmatrix} = 0 \qquad (12)$$

The effect of this equation is that the color affinity $W_{ij}$ for two pixels with the same color (i.e. same α*), is a positive quantity varying with the homogeneity of the local windows containing the pixels i and j as governed by Eqn. 9. But for pixels with different color (i.e. different α*) the color affinity is zero. In essence the rows of the laplacian matrix L work as a zero-sum filter kernel, after appropriate resizing of the window.

This leads to the formulation of the Bi-affinity filter as:

$$h_{\sigma, \varepsilon}(x) = \frac{\sum_{y \in \Omega_x} (f_s^\sigma(x, y) L_{xy}^\varepsilon I(y))}{\sum_{y \in \Omega_x} (f_s^\sigma(x, y) L_{xy}^\varepsilon)} \qquad (13)$$

FIG. 1 illustrates a sample setup for implementing the present Bi-affinity filter. The input image may be provided in a digital memory 110 that is in communication with a data processing device 112, such as a microcomputer, CPU, ASIC, PLD, CPLD, or other type of data processing or computing device. In the present case, data processing device 112 processes the input image in memory 110 according to processing steps defined by equation 13, where the dependence on user specified parameters σ and ϵ on the filter output are denoted. I and h are the input and output images respectively, x and y are pixel locations over an image grid, and $\Omega_x$ is the neighborhood induced around the central pixel x. In the present case, $f_s$ (x, y) measures the spatial affinity between pixels at x and y, where parameter σ controls the amount of spatial blurring and serves a similar purpose as the spatial filter variance (i.e. $\sigma_s$ in eqn. 3) in a traditional bilateral filter. $L_{xy}^\epsilon$ the laplacian matrix (or matting laplacian) that provides positive color affinity value for two examined pixels (x and y) that have the same color and provides a zero color affinity value for pixels with different color. The parameter ϵ, a regularization term, works analogous to the range variance parameter (i.e. $\sigma_r$ in eqn. 4) in a traditional bilateral filter. Note that the relative weight attributed to regularization term ϵ determines the smoothness of the α estimates (i.e. the smoothness of color blending from pixel to pixel), which in the present work translates to the smoothness of the filtered image. The output image h may be saved back to memory 110 or may be stored in another memory device, not shown.

A couple of methods are presented below for speeding up the processing of $W_{ij}$ values, as defined in Eqn. 9. As is explained above, the present process is applicable in the RGB color space, which provides three color values per pixel (i.e. a red color value, a green color value, and a blue color value).

Before continuing, it should be noted that the methods herein described may be implemented in specialized or general data processing hardware.

Figure 2:
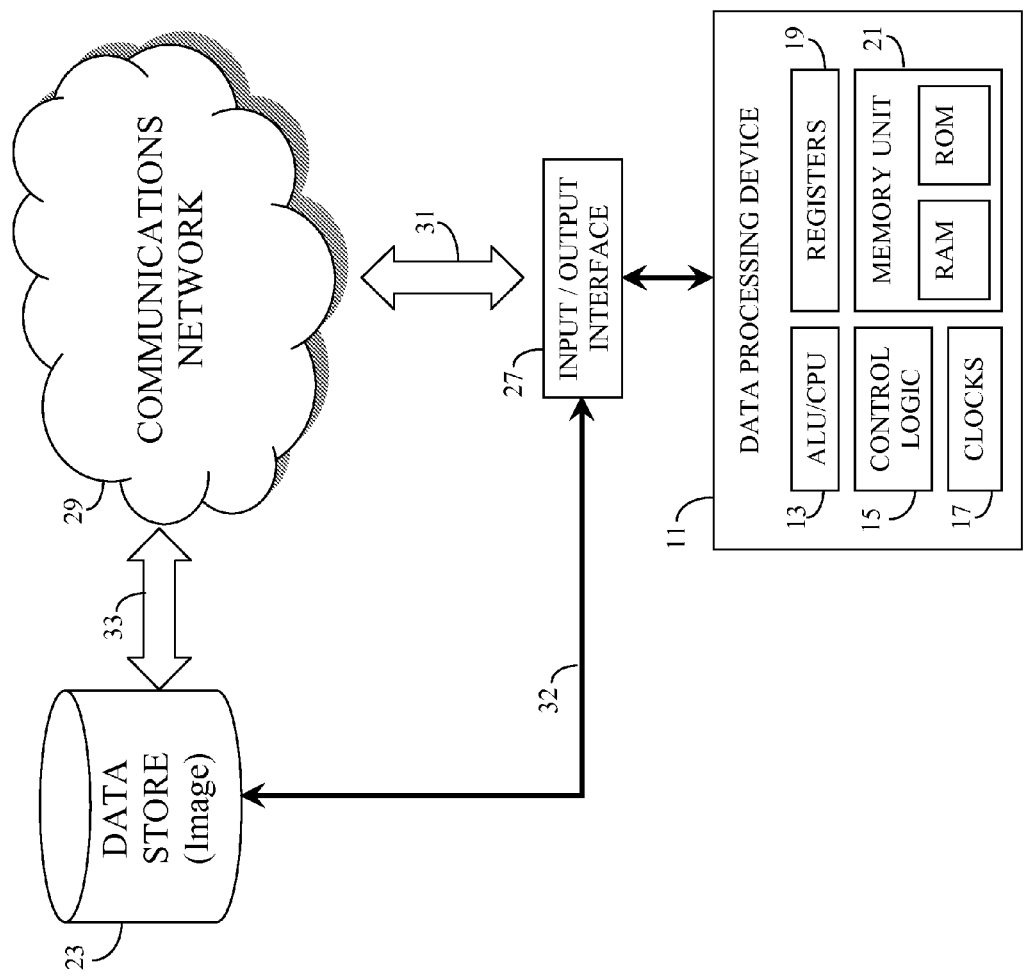
FIG. 2 shows exemplary hardware for implementing the present invention.

With reference to FIG. 2, a general example of such data processing hardware may include a data processing device 11, which may be implemented as a micro-computer, a central processing unit (CPU), a specialized image processor, a programmable logic device (PLD), a complex programmable logic device (CPLD), an application specific integrated circuit (ASIC), or other computing device. In general, data processing device 11 may include an arithmetic logic unit (ALU) and/or CPU 13, control logic 15, various timing clocks 17, various types of registers 19 (including data registers, shift registers, workspace registers, status registers, address registers, interrupt registers, instruction registers, program counters, etc.), and a memory unit 21 (including RAM and/or ROM).

In the present example of FIG. 2, color image(s) to be processed may be maintain in a data store 23 (or alternatively may be provided directly by an image generating device such as a digital still camera, digital video camera, image scanner, etc). Data processing device 11 maybe directly access data store 23 via a direct link 32 and appropriate input/output interface 27, or may alternatively access data store 23 via communication links 31/33 and network 29, which may be a LAN, WLAN, or the Internet. Communication links 31/33 may be wired or wireless communication links.

A first method for speeding up the processing of $W_{ij}$ values makes use of the fact that determination of $W_{ij}$ values includes determining several pixel statistics, such as the difference in RGB, $R^2G^2B^2$, and RG-RB-GB values between pixels. That is, the operations involved in computing the $W_{ij}$ values, as defined in Eqn. 9, can be implemented by accumulating sufficient statistics over windows.

If memory complexity is not an issue, a first method for speeding up its processing is to pre-compute the needed quantities. Since an RGB image provides three quantities per pixels (i.e. red, green and blue color values), storing additional quantities for $R^2G^2B^2$ and RG-RB-GB per pixel would be equivalent to storing two additional 3-channel images of information in memory.

FIG. 3A illustrates an image with RGB values for each pixel from location (0,0) at an upper left corner to pixel (M,N) at a lower right corner. FIG. 3B provides $R^2G^2B^2$ values for each pixel, and FIG. 3C shows pre-calculated RG-RB-GB values for each pixel.

Figure 4A:
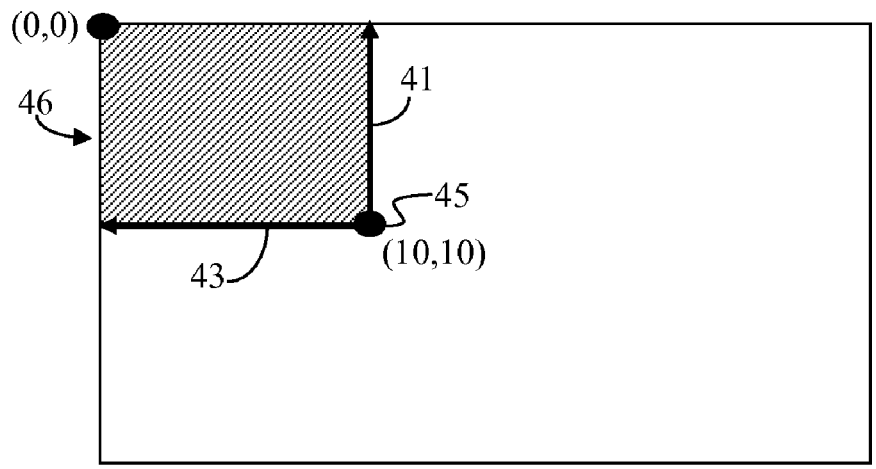
FIG. 4A illustrates the structure of an integral image.

The processing of needed statistics can be further improved by representing the quantities of each pixel in FIGS. 3A to 3C in integral image form. With reference to FIG. 4A, an integral image provides the sum of pixel values for all the pixels enclosed within the vertical 41 and horizontal 43 boundaries of each pixel 45, back to the origin at pixel location (0,0). For example, pixel 45 at location (10,10) provides the accumulated pixel values of the pixels enclosed within shaded area 46.

Figure 4B:
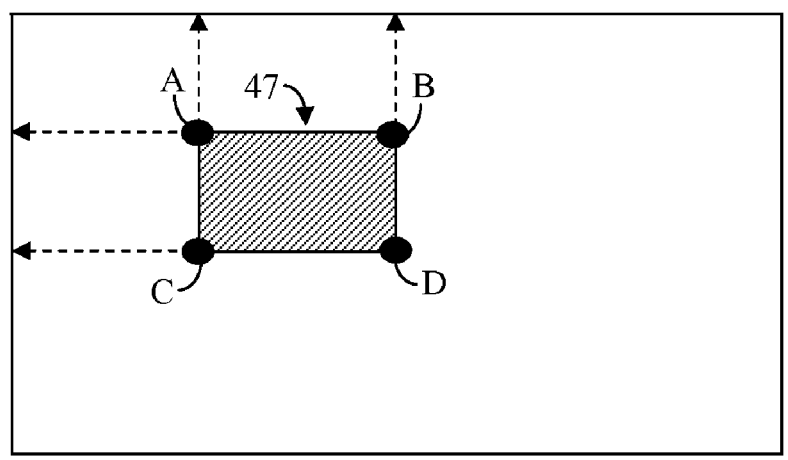
FIG. 4B illustrates an application of an integral image.

Thus, an integral image provides an efficient method of calculating relational values between pixels. For example, in FIG. 4B, calculating the sum of quantity values within shaded area 47 can be determined by appropriate summing and subtracting of the accumulated values, i.e. integral values, at the four corners A, B, C, and D of the shaded area 47. Thus, re-writing a 3-channel color image into 9 integral images (one for each channel: R, G, B, $R^2$, $G^2$, $B^2$, $R^G$, RB, and GB) would provide an efficient way of calculating the quantities needed for determining $W_{ij}$ values.

For relatively large image files such as HDTV images, however, this method may not be optimal due to the large memory overhead. A second method for improving the efficiency of calculating needed values is to collect sufficient statistics for a current window and then, while maintaining most of the current statistic information in memory, updating the statistics only for a new window row in each unit-move vertically (up by one pixel, or down by one pixel), or updating the statistic for a new window column in each unit-move horizontally (left by one pixel, or right by one pixel). This method and some variations on this method are explained more fully below.

With reference to FIG. 5, a window 50a-50c may vary in size from a radius of 1, 2, 3 or more pixels out from a center pixel C, whose values are being calculated relative to every other pixel within its radius window. In FIG. 5, each pixel is illustrated as a square. Typically, each time a window is shifted by one unit (i.e. one pixel); the statistics for all pixels within the shifted window are recalculated anew.

Efficiency can therefore be improved if memory is provided to store statistics calculated from an immediately-previous window position prior to a current window shift.

Figure 6:
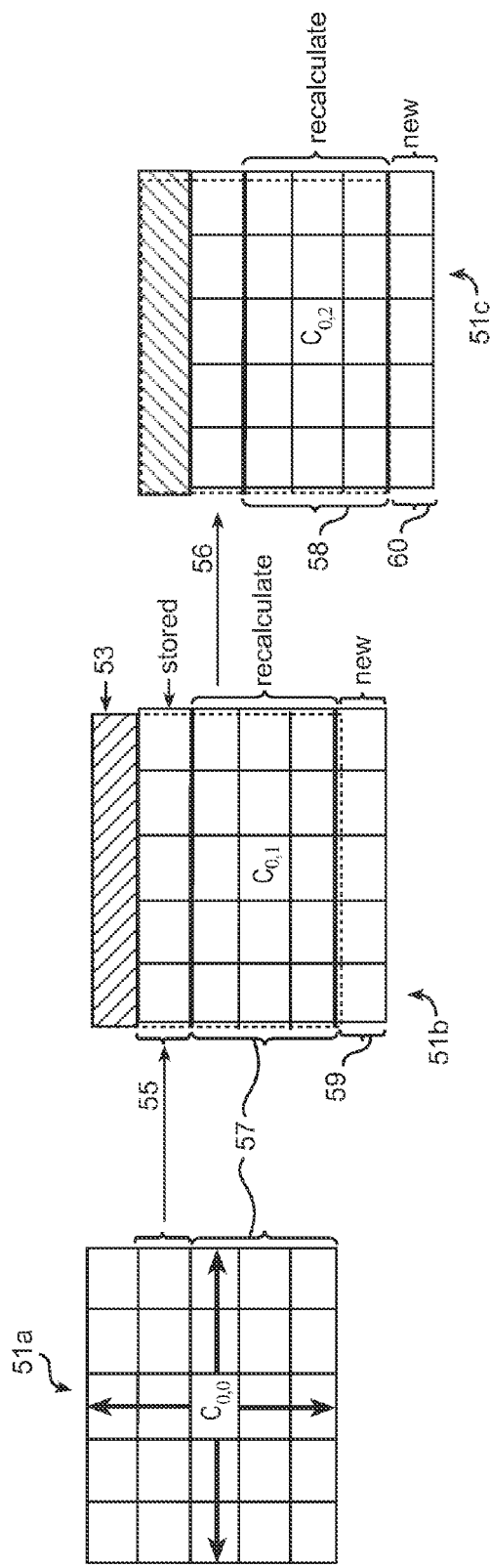
FIG. 6 illustrates an improved application of a shifting window by storing one row of statistics from an immediately previous position to the next.

With reference to FIG. 6, this first example assumes a window 51a with a radius of 2 pixels (i.e. r=2) surrounding a center pixel C (illustratively assigned position (0,0). It is to be understood that the radius of 2 pixels is purely for illustration purposes, and the present method may be applied to a pixel window of a different radius size. For ease of explanation, the present example assumes that window 51a does not extend to a corner of an image, but is located completely within the interior of the image.

Implementation of the present method depends on the amount of available memory. In the present first implementation, it is assumed that only one row of statistics data is retainable from one window position to the next. In operation, one first determines the statistics for all 25 pixels within window 51a. As window 51a is incremented by a one-unit shift (i.e. one pixel-shift step) downward, as illustrated by window 51b, the top row of pixel statistics (illustrated by shaded area 53) are discard, the second row of windows statistics 55 are retained, and the remaining statistics from the first window 51a are likewise discard. Consequently, all the rows of the new window 51b, except for its top row 55, need to be determined anew. Thus, not only does new row 59 need to be determined, region 57, which identifies those pixels whose statistic values had already been calculated for processing in previous window 51a, needs to be recalculated.

When the window is again shifted by a one-unit shift, as is illustrated by window 51c, rows 55 and 59 of window 51b, as well as most of region 57, are discarded. Only the top row 56 is retained. Consequently, not only does new row 60 need to be determined, but region 58 also needs to be recalculated. Region 58 identifies those pixels whose statistic values had already been previously calculated as row 59 and part of region 57 in previous window 51a.

Thus, the efficiency of this approach can be improved by increasing the number of rows that may be retained from one window location to the next.

Figure 7:
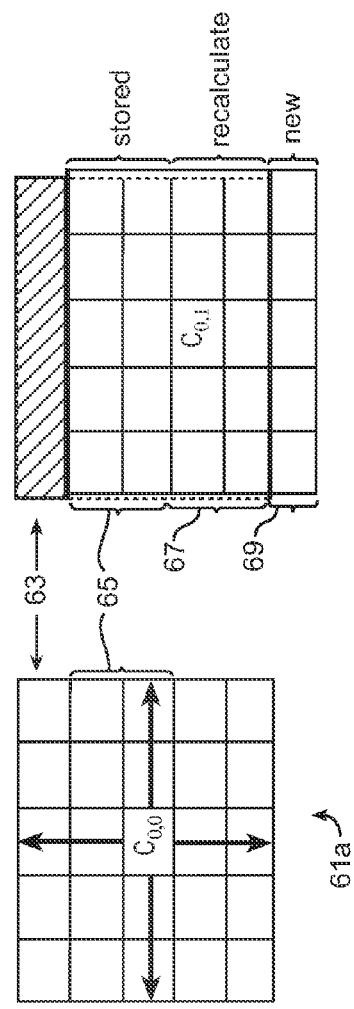
FIG. 7 illustrates an improved application of a shifting window by storing two rows of statistics from an immediately previous position to the next.

For example in FIG. 7, two rows of pixel statistic can be retained from one window position to the next. Therefore, when shifting from a first window 61a to the next 61b, the top row 63 is again discarded, but the next two rows (region 65) are retained. Consequently statistics for only the remaining two rows (region 67) from the first window 61a need to be recalculated, and the one additional new row 69 also needs to be determined.

Figure 8:
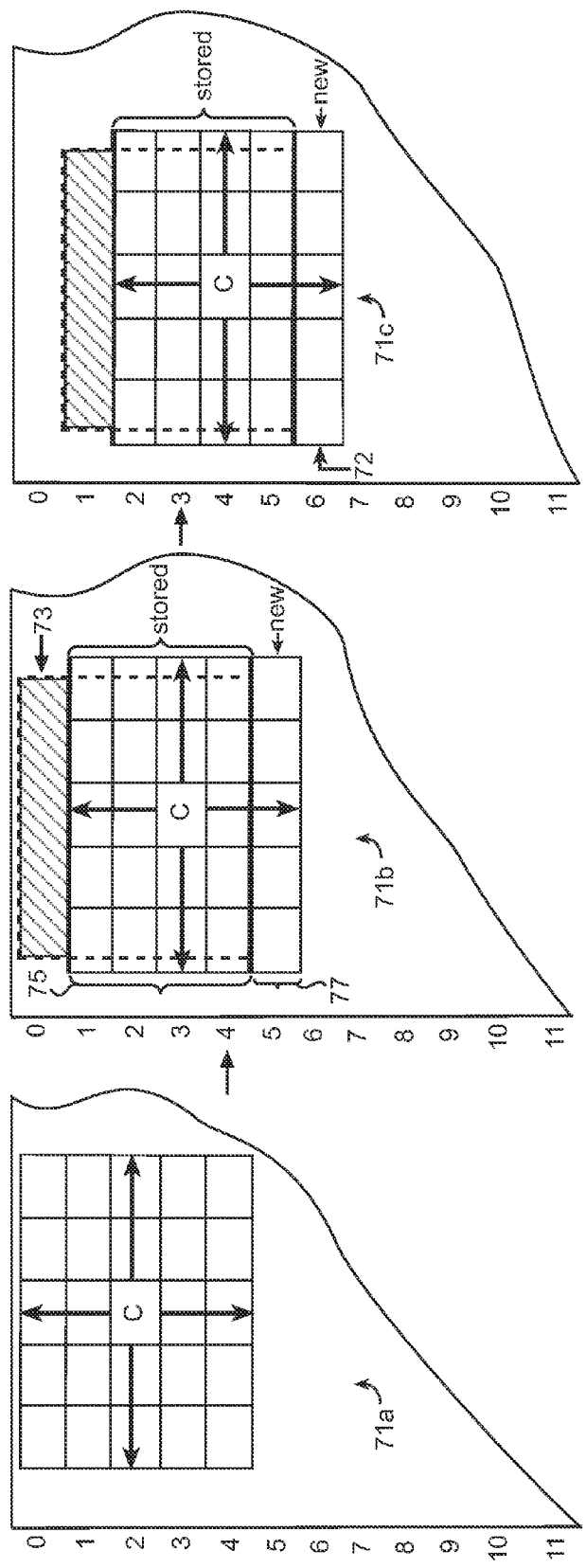
FIG. 8 illustrates an improved application of a shifting window by storing all but the first row of statistics from an immediately previous position to the next.

A preferred embodiment is illustrated in FIG. 8. Like before, window 71a is a first window location for which statistics need to be determined for all pixels within its boundaries. In the present case, however, one row less than the total number of rows within window 71a are retained when making a one-unit shift. In the current example, window 71a consists of five rows of pixels, so sufficient memory is provided to store statistics for four rows of pixels. When moving down one pixel row to define a second window 71b, the top row 73 of previous window 71a may be discarded, and the remaining rows of previous window 71a, identified by region 75 in window 71b are retained. Thus statistics for only the new row 77 need to be determined.

A similar shift from window 71b to window 71c, discards the top row from window 71b, but retains the statistics for all the remaining pixel rows within window 71b. Statistics for only the bottom row 72 of window 71c, which is a new row, need to be determined. Thus, only one row of statistics needs to be determined per unit-shift of the window.

Another variation is to increase the number of pixel statistics calculated per window, $W_{ij}$. That is, an extended window bigger than $W_{ij}$ with $W_{ij}$ at its center is defined, and the pixels within the extended window are processed. Although this results in a larger number of pixels to be processed in the initial, extended window, as the extended window is moved by each unit-shift to span the entire input image, a greater number of center pixels may be processed per unit-shift of the extended window than is possible per unit-shift of window $W_{ij}$. This results in a smaller overall number of new statistics determinations per unit-shift.

Figures 9A, 9B:
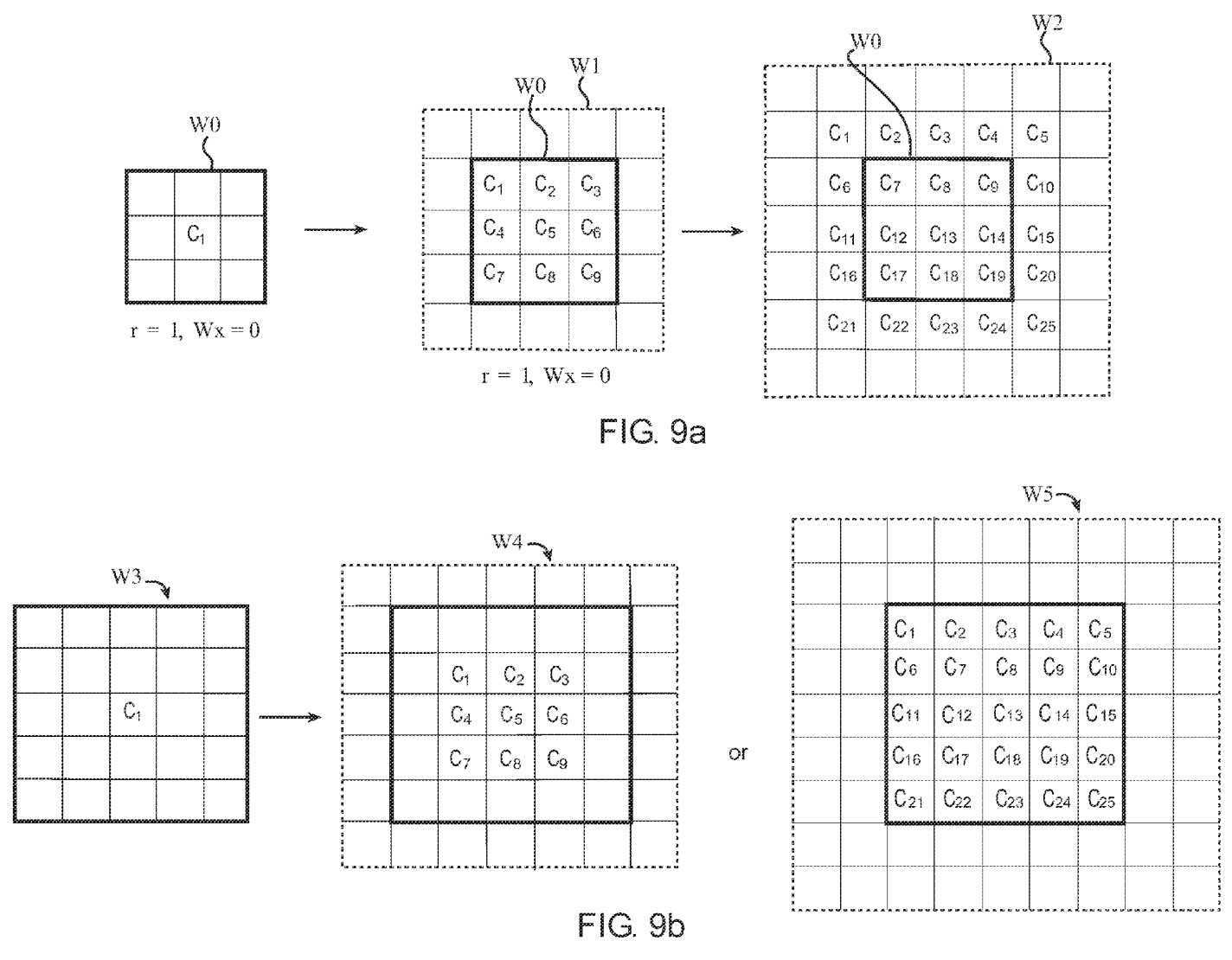

Two examples of this approach are illustrated in FIGS. 9a and 9b. In FIG. 9a, an initial window $W_{ij}$ (identified as W0) has a radius of r=1 (i.e. a one-pixel radius around center window $C_1$), and no extended window around it (i.e. Wx=0). As shown, an extended window W1 may be placed around initial window W0, by extending the radius by one pixel (i.e. Wx=1) around initial window W0. The radius of extended window W1 is therefore Wx+r from its center. Although this means that statistics for 25 pixels need to be determined in the initial, extended window W1 (as opposed to only 9 pixels in the original, initial window W0), a total of 9 center pixels $C_1$ to $C_9$ may be processed in this initial step. As will be illustrated below, after this initial processing of extended window W1, a further increase in efficiency is attainable extended window W1 is shifted to span an input image.

As a second example, if a larger extended window W2 that increases the radius of initial window W0 by two additional pixels from its initial radius of r=1 is used (i.e. Wx=2, and the radius of extended window W2 is Wx+r), then statistics for a total of 49 pixels need to be determined in the initial, extended window W2, which is an increase of 40 pixels the 9 pixels needed for initial window W0. Although this is an increase of about 4½ times more pixels to be processed in the initial, extended window W2, this results in 25 center pixels ($C_1$ to $C_{25}$) being processed in this initial step.

A second example using a larger initial window $W_{ij}$ (identified as W3) having a radius of two pixels (i.e. r=2) surrounding center pixel $C_1$ is shown in FIG. 9b. In the traditional approach, statistics for 25 pixels enclosed within initial window W3 need to be determined in order to process one center pixel, $C_1$. However, if the perimeter of window W3 is increased by one pixel (i.e. Wx=1), as is illustrated by extended window W4 (whose radius is Wx+r), and statistics are determined for the enclosed 49 pixels, these results in 9 center pixels, $C_1$-$C_9$, being processed. This is a reduction from 25 pixels statistics per center pixel in initial window W3, down to less then 5½ statistics per center pixel in extended window W4.

As was the case with window W2 of FIG. 9a, this improvement can be enhanced by increasing the size of the extended window. For example, if the span of initial window W3 in creased by a radius increase of two pixels (Wx=2), as illustrated by extended window W4 (whose radius is Wx+r), this results in statistic for 81 initial pixels being determined to process 25 center pixels, $C_1$-$C_{25}$. This is a reduction from 25 pixels statistics per center pixel in initial window W3 down to less then 3¼ statistics per center pixel in extended window W4.

As is evident from the examples of FIGS. 9a and 9b, the increase in the number of center pixels that may be processed per unit extension (Wx) from the initial radius r is independent of the value of initial radius r. That is, if the extended window increases initial radius by one pixel (i.e. Wx=1), this results in 9 center pixels being processed irrespective of the initial value of radius r. Similarly, if the extended window increases the initial radius by two pixels (i.e. Wx=2), this results in 25 center pixels being processed irrespective of the initial value of radius r. Thus, the total number of center pixels that are process per unit increase, Wx, in the extended window may be defined as $C_{Total}=(2Wx+1)^2$, where $C_{Total}$ is the total number of center pixels processed.

It is to be understood that the size of the extended window is smaller than the overall, total size of the input image, and preferably less than a quarter the size of the input image.

Efficiency may further be improved by storing previously calculated pixel statistics from an immediately previous extended window, when analyzing the next extended window following a unit-shift.

Figure 10:
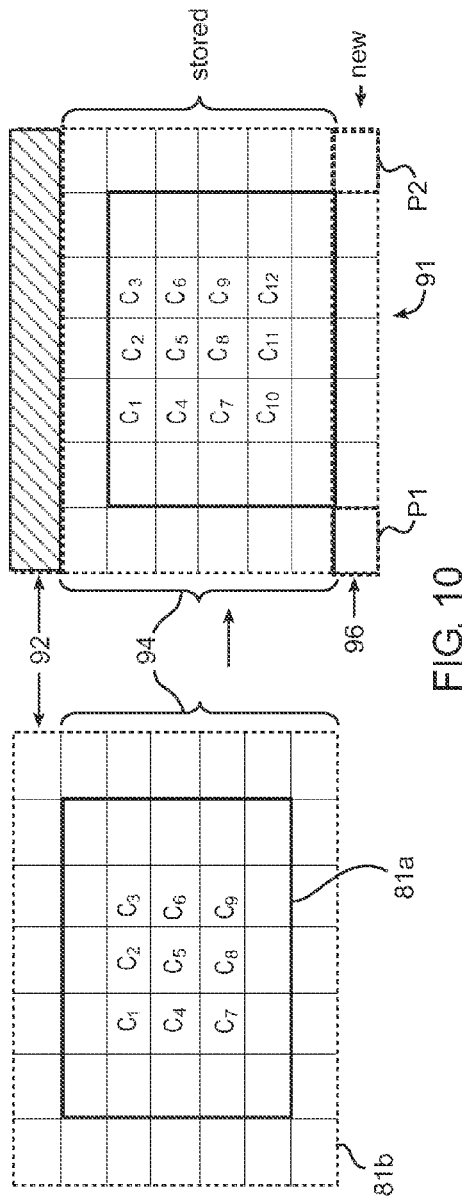
FIG. 10 illustrates the shifting of expanded window W4 from FIG. 9B, where all but the first row of statistics from an immediately previous position to the next are stored.

For example in FIG. 10, if an initial window 81a is extended by one additional pixel radius to form an extended window 81b, nine center pixels $C_1$ to $C_9$ may be processed in this initial step. If all but one row of extended window 81b may be retained when moving from one window position to the next, then the top row 92 from extended window 81b may be discarded and the remaining rows (region 94) may be retained for processing of shifted window 91. In the present case, statistics for only the pixels along the bottom row 96 of shifted window 91 need to be determined. Processing the bottom row of shifted window 91 results in three more center pixels (i.e. C10-C12) being processed per row, instead of just one more center pixel per row as would have been the case if original window 81a had been used.

Note that processing the bottom row requires gathering statistics for only two more pixels, P1 and P2, than would already have been required by the processing of originally-sized, initial window 81a if extended window 81b had not been used. Thus for an increase in the row size of less than half the original length, three times more center pixels may be processed per window shift.

Figure 11:
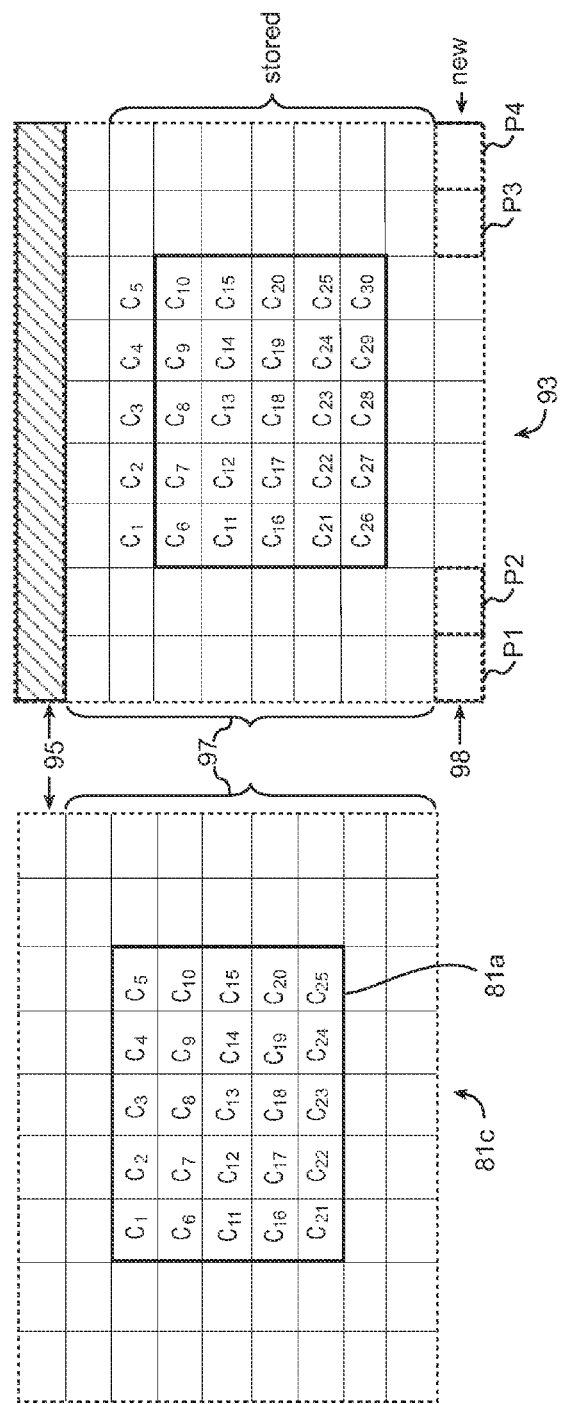
FIG. 11 illustrates the shifting of expanded window W5 from FIG. 9B, where all but the first row of statistics from an immediately previous position to the next are stored.

This is again illustrated in FIG. 11, where window 81a is extended by two additional pixels to form extended window 81c in order to process 25 center pixels $C_1$ to $C_{25}$ in this initial step. If all but one row may be retained when moving by a one-unit shift from one row to the next, as is illustrated by extended window 93, then the top row 95 extended window 81c may be discarded and the remaining rows (region 97) retained for processing extended window 93. In the present case, statistics for only the pixels along the bottom row 98 of extended window 93 need to be determined. Processing the bottom row 98 of dotted window 93 results in five more center pixels (i.e. $C_{26}$-$C_{30}$) being processed per row. Note that processing the bottom row requires determining statistics for four more pixels (P1-P4) than would already have been required by the processing of originally-sized, initial window 81a. Thus for an increase in the row size of about 80%, five times more center pixels may be processed per window shift.

Experimental results for the Bi-affinity filter, as defined by equation 13, are as follows.

Figure 12:
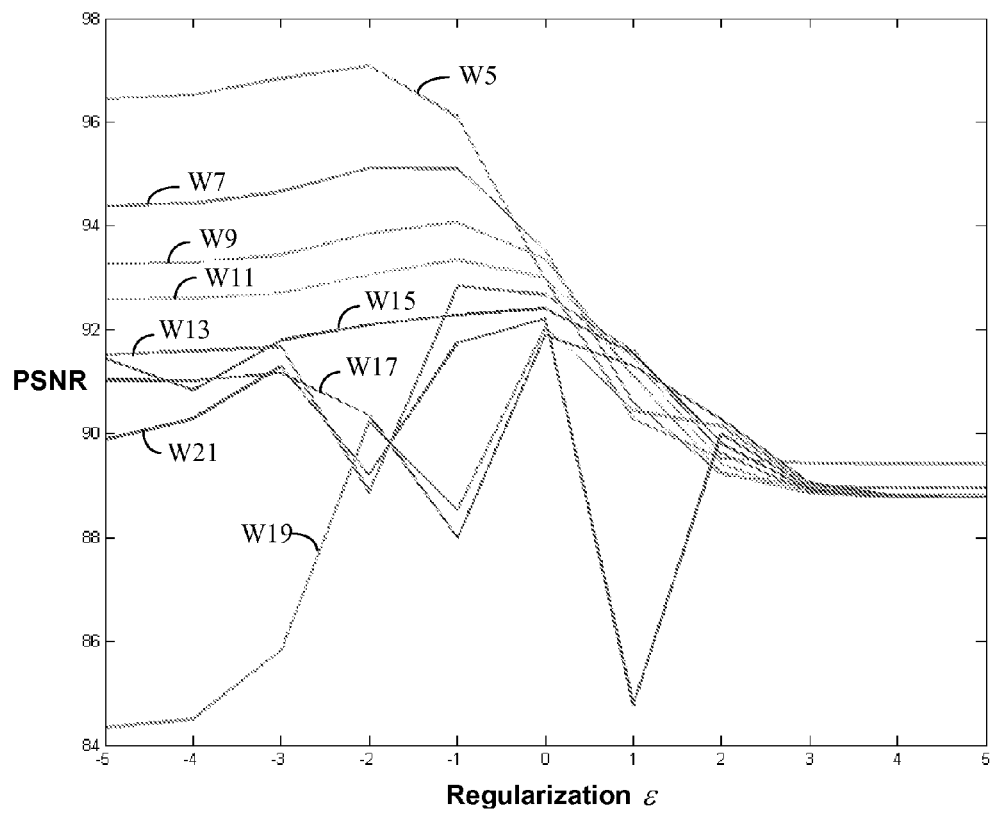
FIG. 12 illustrates the affect of regularization term $\epsilon$ on windows of various sizes.

With reference to FIG. 12, the regularization term $\epsilon$ in the affinity formulation (i.e. eqn. 13) works as an edge smoothness term. For understanding the effect of this term, the amount of regularization $\epsilon$ used was varied for each of nine square windows, W5, W7, W9, W11, W13, W15, W17, W19, and W21, with each window having a size of 5, 7, 9, 11, 13, 15, 17, 19, and 21 pixels per side, respectively. The power-to-signal noise ratio, PSNR, for each window with respect to the original image was recorded. As shown, the PSNR degrades for larger window sizes. This is in keeping with the two color model, which is valid only for small windows. However, the regularization term $\epsilon$ neutralizes the effect of window size to a certain degree, as is evident by the band of values collecting near the PSNR value of 90 dB. This suggests a possible tradeoff between PSNR and edge smoothness. For very small regularization values, the noise across the edge can contribute to the jaggedness of the reconstruction. This effect can be countered by increasing regularization term $\epsilon$, but the increased regularization can come at the cost of increased smoothness of the overall image.

Empirically, good results have been obtained for larger window sizes by keeping values of regularization term $\epsilon$ relatively larger than those proposed in the matting literature mentioned above (i.e. preferably at least 1.5 times larger).

With reference to FIG. 13, the effect of regularizations term $\epsilon$ for a fixed window size are illustrated by showing the results assigning values 0.0005, 0.005, 0.05, and 0.5 to regularization term $\epsilon$. The edge reconstruction becomes increasingly jagged as the amount of regularization is decreased, as is more clearly seen in the close-up view at the upper-right corner of each sample image.

With reference to FIG. 14, the upper-left corner image shows an original input image, to which the bilateral filter and the present approximate Bi-affinity filter will be applied. The results of applying the bilateral filter with parameters w=11; $\sigma_d$=5, and $\sigma_r$=0.1 in the input image's native RGB color space (with the bilateral filter individually applied to each of the Red color channel, Green color channel, and Blue color channel) is shown in the upper-right corner. As shown, the resultant soften image suffers from color artifacts at sharp color edges that may be perceived as a loss in image definition.

However, if the input image is first converted from the RGB color space to the CIELAB color space, and the bilateral filter is then individually applied to each of the three CIELAB color channels with same parameters of w=11; $\sigma_d$=5, and $\sigma_r$=0.1, then the resultant soften image is more clearly defined, as is shown in the lower-left corner of FIG. 14.

Nonetheless, as is shown in the lower-right corner of FIG. 14, similar results are obtained by applying the present Bi-affinity filter to the original input image in its native RGB color space, with no $\sigma_r$, and with a regularization factor of $\epsilon$=0.1. Thus, the response of the bilateral filter in the CIELAB color space and the Bi-affinity filter in the native RGB color space is very similar, even though the Bi-affinity filter does not need, or use, any color conversions, resulting in a reduction in filter processing steps.

Another set of experimental results similar to those of FIG. 14 for comparing the Bi-affinity filter to the bilateral filter in both the native RGB color space and in the CIELAB color space is shown in FIG. 15. In the present case, the bilateral filter, both in the native RGB color space and in the converted CIELAB color space is applied with the following parameters: w=21; $\sigma_d$=3, $\sigma_r$=0.13. Additionally, the present Bi-affinity filter is applied in the input image's native RGB color space with the following parameters: no $\sigma_r$, and $\epsilon$=0.01. Again, the results obtained with the present Bi-affinity filter are visually very similar to those obtained with the prior art bilateral filter applied in the color converted CIELAB color space.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of processing a digital, input image, comprising:
   providing said digital input image, I, in physical memory, said input image having color information in a native color space for each image pixel;
   providing a processing device coupled to said physical memory to access said input image I and create an output image, h, by implementing the following steps:
   applying an image filtering sequence to said input image I, wherein said image filtering sequence applies a filtering algorithm to each pixel of said input image I relative to its surrounding pixels within a window w having a fixed, predefined radius of r pixels extending from a center pixel, pixels of said input image I being processed, in turn, as said center pixel relative to their corresponding window w;
   the applying of said image filtering sequence including:
   (a) for a first of said window w of a first pixel in said input image I to be processed according to said filtering algorithm, defining an extended window bigger than said first window w with said first window at its center;
   (b) determining statistics needed for said filtering algorithm for all pixels within said extended window;
   (c) applying said filtering algorithm to all center pixels whose corresponding window w fit fully within said extended window;

(d) shifting said extended window within said input image by one unit-shift at a time, wherein at each unit-shift:
  (i) new statistics are determined for only the new pixels encompassed by the shifted extended window, said new pixels defining a new row or column within the shifted extended window; and
  (ii) applying said filtering algorithm to all center pixels whose corresponding window w extends to said new row or column.

2. The method of claim 1, wherein said window w and said extended window are smaller than said input image.

3. The method of claim 2, wherein said extended window is not greater than one-fourth of the size of said input image.

4. The method of claim 1, wherein the pixel radius of the extended window is defined as the radius r of window w increased by Wx additional pixels, and the number of said center pixels in step (c) is limited to not more than $(2Wx+1)^2$.

5. The method of claim 1, wherein statistics are determined by calculating said statistics from the image values of each pixel, and in step (d) all but one row or one column of the statistics calculated for the extended window at its immediately previous position are retained when shifting from said immediately previous position to a new position by one unit-shift.

6. The method of claim 1, wherein the image values of the pixels within said input image are rearranged into integral image form.

7. The method of claim 1, wherein said statistics are calculated and arranged into integral image form prior to the applying of said image filtering sequence, and statistics are determined in steps (b) and (i) by accessing the integral images for the needed statistics.

8. The method of claim 1, wherein said filtering algorithm includes a Bi-Affinity filter defined as $$h_{\sigma,\varepsilon}(x) = \frac{\sum_{y \in \Omega_x} (f_s^\sigma(x,y) L_{xy}^\varepsilon I(y))}{\sum_{y \in \Omega_x} (f_s^\sigma(x,y) L_{xy}^\varepsilon)}$$

where x and y are pixel locations over an image grid, and $\Omega_x$ is the neighborhood induced around the central pixel x; $f_s(x,y)$ measures the spatial affinity between pixels at x and y; parameter σ controls an amount of spatial blurring; $L_{xy}^\varepsilon$ is a laplacian matrix that provides positive color affinity value for two examined pixels, x and y, that have the same color and provides a zero color affinity value for pixels with different color; parameter ε is a regularization term whose relative weight determines the smoothness of output image h, and said laplacian matrix $L_{xy}^\varepsilon$ follows a 2 color model specifying that pixel color $I_i$ in input image I can be represented as a linear combination of two colors P and S as follows:

$I_i = \alpha_i P + (1-\alpha_i)S, \forall i \in w, 0 \leq \alpha_i \leq 1$ where the two colors are piecewise smooth and can be derived from local properties within neighborhood $\Omega_x$ containing pixel i, and wherein piecewise smooth means smooth within a region of similar in size as window w.

9. The method of claim 8, wherein the Bi-Affinity filter is applied to said input image I in its native color space.

10. The method of claim 9, wherein said native color space is the RGB color space.

11. The method of claim 8, wherein parameter ε determines the smoothness of the decomposition into said two color modes as represented by the smoothness of α estimates.

12. The method of claim 8, wherein $\alpha_i$ is defined as:

$$\alpha_i = \sum_c a^c I_i^c + b, \forall i \in w$$

where a are weights for each color channel and is constant for the window w, b is a model parameter, and c is an index over the color channels.

13. The method of claim 12, wherein the α values are determined according to quadratic cost function $J(\alpha)=\alpha^T L \alpha$.

14. The method of claim 13, wherein laplacian matrix L is an n×n matrix, where n is the total number of pixels in input image I whose $(ij)^{th}$ element is given by $$\sum_{k|(i,j) \in w_k} \left( \delta_{ij} - \frac{1}{|w_k|}\left(1 + (I_i - \mu_k)\left(\sigma_k + \frac{\varepsilon}{|w_k|}I_3\right)^{-1}(I_j - \mu_k)\right) \right)$$

where $\delta_{ij}$ is the Kronecker delta, $\mu_k$ is a 3×1 mean vector of colors inside the $k^{th}$ window with both i and j as members, $\sigma_k$ is the 3×3 covariance matrix, $|w_k|$ is the cardinality of the window and $I_3$ is the identity matrix of size 3×3.

15. The method of claim 14, wherein the laplacian matrix L is further decomposed into a diagonal matrix D and a weight matrix W with the formulation L=D−W, wherein:
  diagonal matrix D is defined with terms $D_{ii}$=#[k|i∈$w_k$] at its diagonal and represents the cardinality of the number of windows of which the pixel i is a member;
  individual terms of weight matrix W are given by $$W_{ij} = \sum_{k|(i,j) \in w_k} \frac{1}{|w_k|}\left(1 + (I_i - \mu_k)\left(\sigma_k + \frac{\varepsilon}{|w_k|}I_3\right)^{-1}(I_j - \mu_k)\right)$$

where $\delta_{ij}$ is the Kronecker delta, $\mu_k$ is a 3×1 mean vector of colors inside the $k^{th}$ window with both i and j as members, $\sigma_k$ is the 3×3 covariance matrix, $|w_k|$ is the cardinality of the window and $I_3$ is the identity matrix of size 3×3; and
  color affinity $W_{ij}$ for two pixels with the same color is a positive quantity varying with the homogeneity of the local windows containing the pixels i and j, and color affinity for pixels with different color is zero.

16. The method of claim 15, wherein at the local minima, the solution α* satisfies a first order optimality condition $L^T\alpha^*=0$, and the optimal condition is defined as $L^T\alpha^*=(D-W)^T\alpha^*$.

17. The method of claim 15, wherein terms of $W_{i,j}$ are evaluated by counting the contribution of only the center pixel's local window defined as the window centered about it.

* * * * *